United States Patent
Toyao et al.

(10) Patent No.: US 9,960,483 B2
(45) Date of Patent: May 1, 2018

(54) ANTENNA, PRINTED CIRCUIT BOARD, AND WIRELESS COMMUNICATION DEVICE

(71) Applicants: NEC CORPORATION, Tokyo (JP); NEC Platforms, Ltd., Kawasaki-shi, Kanagawa (JP)

(72) Inventors: Hiroshi Toyao, Tokyo (JP); Jun Uchida, Kanagawa (JP)

(73) Assignees: NEC CORPORATION, Tokyo (JP); NEC Platforms, Ltd., Kawasaki-shi, Kanagawa (JP)

( * ) Notice: Subject to any disclaimer, the term of this patent is extended or adjusted under 35 U.S.C. 154(b) by 321 days.

(21) Appl. No.: 14/770,132

(22) PCT Filed: Dec. 6, 2013

(86) PCT No.: PCT/JP2013/082821
§ 371 (c)(1),
(2) Date: Aug. 25, 2015

(87) PCT Pub. No.: WO2014/132519
PCT Pub. Date: Sep. 4, 2014

(65) Prior Publication Data
US 2016/0013546 A1  Jan. 14, 2016

(30) Foreign Application Priority Data
Feb. 26, 2013  (JP) .................................. 2013-035539

(51) Int. Cl.
*H04B 1/40* (2015.01)
*H01Q 1/36* (2006.01)
(Continued)

(52) U.S. Cl.
CPC ............... *H01Q 1/36* (2013.01); *H01Q 1/243* (2013.01); *H01Q 9/285* (2013.01); *H04B 1/40* (2013.01)

(58) Field of Classification Search
CPC ........... H01Q 1/243; H01Q 9/285; H04B 1/40
See application file for complete search history.

(56) References Cited

U.S. PATENT DOCUMENTS 5,164,690 A * 11/1992 Yeh ..................... H01P 1/20381
333/203
2010/0283694 A1  11/2010 Kato
(Continued)

FOREIGN PATENT DOCUMENTS

JP  2006-222873 A  8/2006
JP  2011-103703 A  5/2011
(Continued)

OTHER PUBLICATIONS

Communication dated Sep. 5, 2017 from the Japanese Patent Office in counterpart application No. 2015-502723.
(Continued)

*Primary Examiner* — Hoang Nguyen
*Assistant Examiner* — Jae Kim
(74) *Attorney, Agent, or Firm* — Sughrue Mion, PLLC

(57) ABSTRACT

An antenna (10) includes: a first radiant element (3) and a second radiant element (4), which are connected to an antenna feeding point (2); a first branch part (5a), one end of which is connected to the first radiant element (3) at a position not corresponding to an end portion of the first radiant element (3); a second branch part (5b), one end of which is connected to the second radiant element (4) at a position not corresponding to an end portion of the second radiant element (4); and a connection element (7), which connects part of the first radiant element (3) and part of the second radiant element (4). A different end of the first branch part (5a) and a different end of the second branch part (5b) face each other and form a capacitor part. The capacitor part is positioned outside the area surrounded by the connection element (7), the first radiant element (3), and the second (Continued)

radiant element (4). Part of the first radiant element (3), part of the second radiant element (4), the first branch part (5a), the second branch part (5b), and the capacitor part form a split ring resonator (8).

8 Claims, 19 Drawing Sheets

(51) Int. Cl.
      *H01Q 1/24*     (2006.01)
      *H01Q 9/28*     (2006.01)

(56) References Cited

U.S. PATENT DOCUMENTS

| | | | |
|---|---|---|---|
| 2011/0186641 A1 | 8/2011 | Kato et al. | |
| 2012/0223869 A1* | 9/2012 | Kim | H01Q 9/0442 |
| | | | 343/769 |
| 2014/0203993 A1* | 7/2014 | Toyao | H01Q 13/10 |
| | | | 343/867 |

FOREIGN PATENT DOCUMENTS

| | | |
|---|---|---|
| WO | 2009/110382 A1 | 9/2009 |
| WO | 2010/050361 A1 | 5/2010 |
| WO | 2014/132590 A1 | 9/2014 |

OTHER PUBLICATIONS

Kamil Boratay Alici, et al., "Electrically small split ring resonator antennas", Journal of Applied Physics, 2007, pp. 083104-1 to 083104-4, vol. 101.

International Search Report for PCT/JP2013/082821 dated Feb. 25, 2014 [PCT/ISA/210].

Written Opinion for PCT/JP2013/082821 dated Feb. 25, 2014 [PCT/ISA/237].

* cited by examiner

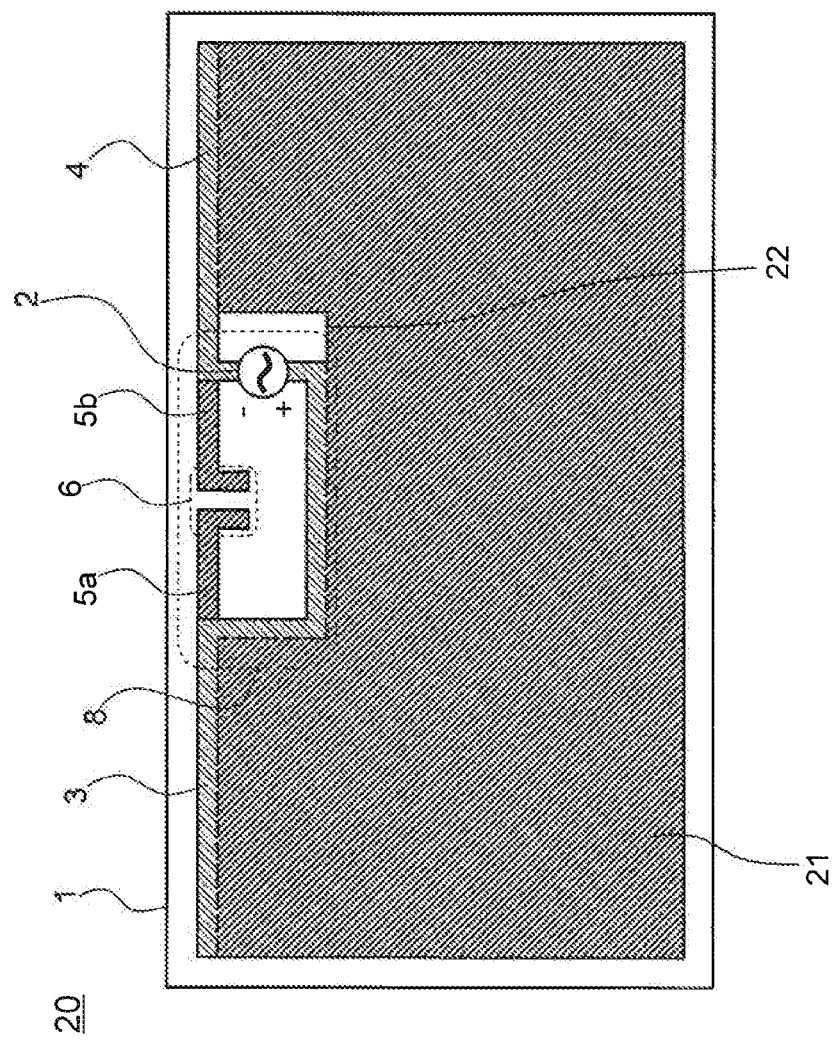

ANTENNA, PRINTED CIRCUIT BOARD, AND WIRELESS COMMUNICATION DEVICE

CROSS REFERENCE TO RELATED APPLICATIONS

This application is a National Stage of International Application No. PCT/JP2013/082821, filed on Dec. 6, 2013, which claims priority from Japanese Patent Application No. 2013-035539, filed on Feb. 26, 2013, the contents of all of which are incorporated herein by reference in their entirety.

TECHNICAL FIELD

The present invention relates to a small antenna, and a printed circuit board and a wireless communication device each of which includes the antenna.

BACKGROUND ART

With regard to electronic devices having communication functions (wireless communication devices), it is constantly desired to downsize the entire devices. In addition, the spread of MIMO (multiple-input and multiple-output) communication systems, which enable increase in capacity by simultaneously using multiple antennas, is leading to an increase in the number of antennas installed in a wireless communication device. For these reasons, reduction in both size and cost of antennas installed in wireless communication devices is strongly desired.

In general, antennas such as dipole antennas and monopole antennas, which have low directivities and are capable of emitting radio waves in a wide range of directions, and inverted L antennas, which are a variation thereof, are used in small wireless communication devices. However, since an antenna of this kind needs to be as large as approximately ¼ to ½ of its wavelength in principle, the downsizing of such antennas has been difficult. In addition, a matching circuit is required for impedance matching between antennas and feeding lines, which causes a problem of an increase in manufacturing cost.

PTL 1 discloses a technique for downsizing an antenna by adding a passive element partially made of a magnetic material to a dipole antenna. The technique described in PTL 1 enables downsizing of an antenna and impedance matching without using any matching circuit, by controlling the distribution of the magnetic lines of force around the antenna by use of a magnetic material. NPL 1 discloses a technique for downsizing a monopole antenna by increasing the effective magnetic permeability by disposing a resonator structure called a split ring resonator near the monopole antenna.

CITATION LIST

Patent Literature

[PTL 1] Japanese Unexamined Patent Application Publication No. 2006-222873

Non Patent Literature

[NPL 1] "Electrically small split ring resonator antennas," Journal of Applied Physics, 101, 083104 (2007)

SUMMARY OF INVENTION

Technical Problem

Low-cost antennas are often formed by using copper foil patterns formed on printed circuit boards. Since the antenna disclosed in PTL 1 needs to use a magnetic material, it is difficult to manufacture the antenna in a general manufacturing process for printed circuit boards, which leads to a problem of increasing the manufacturing cost. Regarding the antenna disclosed in NPL 1, the split ring resonator, which is provided separately from a monopole antenna, needs to be disposed vertically with respect to a ground plane. It is difficult to manufacture the split ring resonator to be disposed vertically with respect to the ground plane, integrally with the ground plane in a general manufacturing process for printed circuit board. Hence, this technique has a problem of increasing the manufacturing cost.

The present invention has been made in view of the above-described circumstances. An example of the aims of the present invention is to provide a small antenna that can be manufactured at a low cost, and a printed circuit board and a wireless communication device each of which includes the antenna.

Solution to Problem

According to the present invention, provided is an antenna including:
an antenna feeding point that includes a first terminal and a second terminal;
a first radiant element that is conductive and connected to the first terminal;
a second radiant element that is conductive and connected to the second terminal;
a first branch part that is conductive and one end of which is connected to the first radiant element at a position not corresponding to an end portion of the first radiant element;
a second branch part that is conductive and one end of which is connected to the second radiant element at a position not corresponding to an end portion of the second radiant element; and
a connection element that is conductive and connects part of the first radiant element and part of the second radiant element,
wherein a different end of the first branch part and a different end of the second branch part face each other and form a capacitor part,
wherein the capacitor part is positioned outside an area surrounded by the connection element, the first radiant element, and the second radiant element, and
wherein part of the first radiant element, part of the second radiant element, the first branch part, the second branch part, and the capacitor part form a split ring resonator.

According to the present invention, provided is a printed circuit board including at least one antenna that includes:
an antenna feeding point that includes a first terminal and a second terminal;
a first radiant element that is conductive and connected to the first terminal;
a second radiant element that is conductive and connected to the second terminal;
a first branch part that is conductive and one end of which is connected to the first radiant element at a position not corresponding to an end portion of the first radiant element;

a second branch part that is conductive and one end of which is connected to the second radiant element at a position not corresponding to an end portion of the second radiant element; and a connection element that is conductive and connects part of the first radiant element and part of the second radiant element, and in which a different end of the first branch part and a different end of the second branch part face each other and form a capacitor part, the capacitor part is positioned outside an area surrounded by the connection element, the first radiant element, and the second radiant element, and part of the first radiant element, part of the second radiant element, the first branch part, the second branch part, and the capacitor part form a split ring resonator.

According to the present invention, provided is a wireless communication device including at least one antenna that includes:

an antenna feeding point that includes a first terminal and a second terminal;

a first radiant element that is conductive and connected to the first terminal;

a second radiant element that is conductive and connected to the second terminal;

a first branch part that is conductive and one end of which is connected to the first radiant element at a position not corresponding to an end portion of the first radiant element;

a second branch part that is conductive and one end of which is connected to the second radiant element at a position not corresponding to an end portion of the second radiant element; and a connection element that is conductive and connects part of the first radiant element and part of the second radiant element, and in which a different end of the first branch part and a different end of the second branch part face each other and form a capacitor part, the capacitor part is positioned outside an area surrounded by the connection element, the first radiant element, and the second radiant element, and part of the first radiant element, part of the second radiant element, the first branch part, the second branch part, and the capacitor part form a split ring resonator.

Advantageous Effects of Invention

According to the present invention, it is possible to provide a small antenna that can be manufactured at a low cost, and a printed circuit board and a wireless communication device each of which includes the antenna.

BRIEF DESCRIPTION OF DRAWINGS

The above-described aim, the other aims, the characteristics, and the advantages become more apparent through the preferable exemplary embodiments described below and the accompanying drawings given below.

FIG. 19 is a top view of a different configuration of the antenna according to the second exemplary embodiment.

DESCRIPTION OF EMBODIMENTS

Exemplary embodiments of the present invention are described below using the drawings. Note that the same reference signs are assigned to the same constituent elements throughout the drawings, and description thereof is omitted appropriately.

First Exemplary Embodiment

An antenna 10 according to a first exemplary embodiment of the present invention is described below with reference to the drawings.

Figure 1:
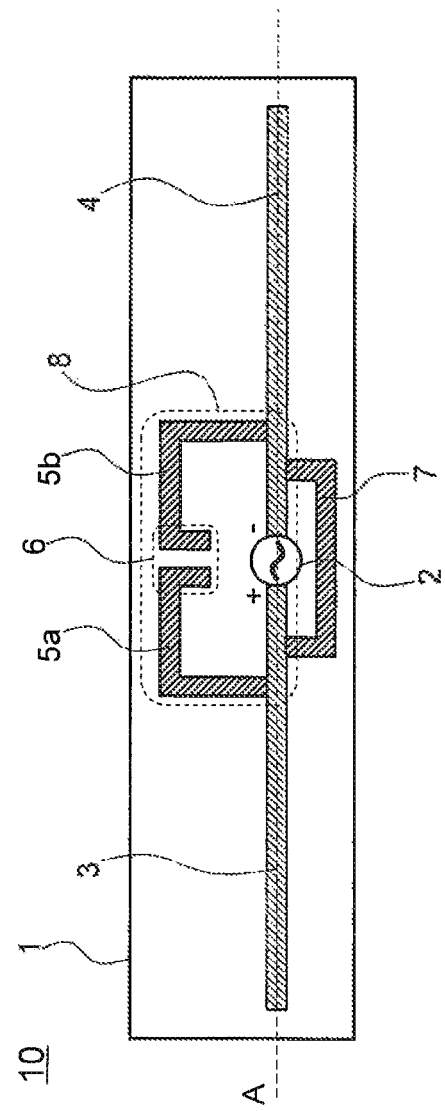
FIG. 1 is a top view illustrating a configuration of an antenna according to a first exemplary embodiment.
Figure 2:
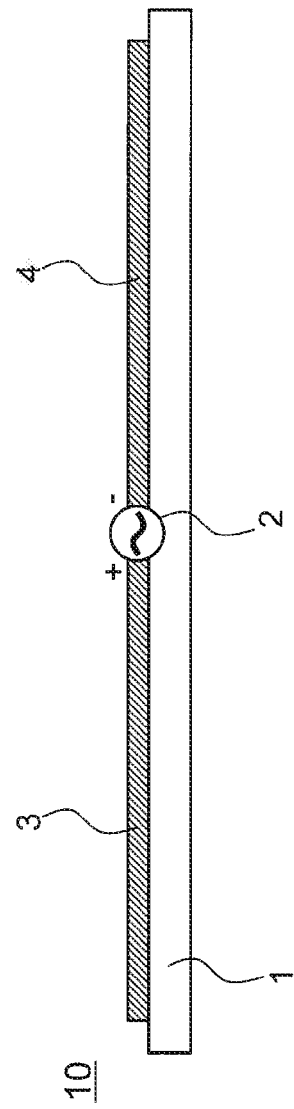
FIG. 2 is a cross-sectional view of the antenna taken along a dotted line A in FIG. 1.

FIG. 1 is a top view illustrating a configuration of the antenna 10 according to the first exemplary embodiment. FIG. 2 is a cross-sectional view of the antenna 10 taken along a dotted line A in FIG. 1. The antenna 10 according to the first exemplary embodiment is formed on a surface layer of a printed circuit board 1 and includes an antenna feeding point 2, a first radiant element 3, and a second radiant element 4. The antenna feeding point 2 includes two terminals (+terminal, −terminal). The first radiant element 3 is a linear conductive pattern connected to the +terminal of the antenna feeding point 2. The second radiant element 4 is a linear conductive pattern connected to the terminal of the antenna feeding point 2. The antenna feeding point 2 is connected to a transmission line that transmits radio signals from an unillustrated radio circuit and is capable of inputting the radio signals from the radio circuit to the antenna 10.

The antenna 10 according to the first exemplary embodiment includes a first branch part 5a and a second branch part 5b, which are conductive patterns. One end of the first branch part 5a is connected to the first radiant element 3 at a position different from any of the ends of the first radiant element 3. One end of the second branch part 5b is connected to the second radiant element 4 at a position different from any of the ends of the second radiant element 4. The other end of the first branch part 5a and the other end of the second branch part 5b face each other so as to form a split 6. The first branch part 5a, the second branch part 5b, the split 6, part of the first radiant element 3, and part of the second radiant element 4 form a C-shaped split ring resonator 8.

In addition to the above, the antenna 10 according to the first exemplary embodiment includes a connection element 7, which is a linear conductive pattern. One end of the connection element 7 is connected to part of the first radiant element 3. The other end of the connection element 7 is connected to part of the second radiant element 4. The connection element 7 electrically connects the first radiant element 3 and the second radiant element 4 so that the split 6 is not included in the area surrounded by the connection element 7, the first radiant element 3, and the second radiant element 4.

The antenna 10 according to this exemplary embodiment is composed of the above-described conductive patterns, which are formed of copper foil on the surface layer of the printed circuit board 1. Using an inexpensive single-layer substrate for the printed circuit board 1 enables the antenna 10 to be manufactured at a low cost. However, the antenna 10 according to this exemplary embodiment does not necessarily need to use a single-layer substrate, and it is conceivable to form the antenna 10 on any one of the layers of a multilayer substrate, for example. The conductive patterns may be formed by a plate or the like as long as being able to manufacture the antenna 10 at a low cost. Alternatively, the conductive patterns may be formed of any of various materials instead of copper foil as long as being conductive. Moreover, the materials used for the conductive patterns may be the same or different.

Operation of the antenna 10 according to this exemplary embodiment is described below.

Figure 3:
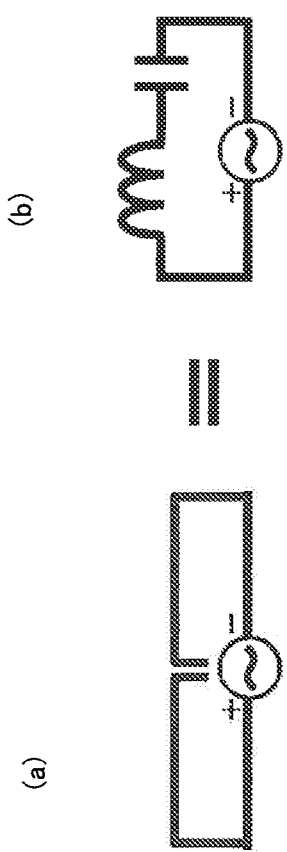
FIG. 3 depicts diagrams illustrating an equivalent circuit of a split ring resonator according to the first exemplary embodiment.

FIG. 3 depicts diagrams illustrating an equivalent circuit of the split ring resonator 8 according to the first exemplary embodiment. FIG. 3(*a*) corresponds to part of the feeding point and the split ring resonator 8 of the antenna 10 according to this exemplary embodiment, and FIG. 3(*b*) illustrates an equivalent circuit corresponding to this part. The current fed from the antenna feeding point 2 flows annularly in the split ring resonator 8, and consequently inductance occurs. Capacitance occurs between the conductive patterns facing at the split 6. Since the inductance and the capacitance are connected in series, the split ring resonator 8 forms a series LC resonant circuit and operates as an antenna that radiates electromagnetic waves into a space at around the resonant frequency.

In the case of a general antenna, which is represented by a dipole antenna, the entire antenna causes resonance, and hence it is difficult to reduce the length of such an antenna to that smaller than approximately half the wavelength of the electromagnetic waves having the operating frequency.

With respect to the operating frequency of the antenna 10 according to this exemplary embodiment, it is easily possible to lower the resonant frequency by increasing the inductance by way of increasing the length of the ring of the split ring resonator 8 or by increasing the capacitance by way of reducing the distance between the conductive patterns facing at the split 6. Especially by use of the method of increasing the capacitance of the split 6, the operating frequency can be reduced without increasing the entire size although the loss increases due to concentration of the electric field to the split 6, and hence it is possible to provide a small antenna in comparison with the wavelength of the electromagnetic waves.

However, it is not possible to obtain a practical radiant efficiency only with the current flowing in the split ring resonator 8. In consideration of this respect, the antenna 10 of this exemplary embodiment significantly increases the radiant efficiency by leading part of the current flowing in the split ring resonator 8 to the first radiant element 3 and the second radiant element 4. The radiant efficiency of the antenna 10 according to this exemplary embodiment can be improved by increasing the lengths of the first radiant element 3 and the second radiant element 4.

In the antenna 10 according to this exemplary embodiment, the impedance of the antenna seen from the antenna feeding point 2 can easily be controlled by changing the positions at which the connection element 7 is connected to the first radiant element 3 and the second radiant element 4. In order to control the impedance of the antenna, the position at which the connection element 7 and the first radiant element 3 are connected may be between the open end of the first radiant element 3 and the position at which the first branch part 5a and the first radiant element 3 are connected, different from FIG. 1. Similarly, the position at which the connection element 7 and the second radiant element 4 are connected may be between the open end of the second radiant element 4 and the position at which the second branch part 5b and the second radiant element 4 are connected, different from FIG. 1. In this way, in the antenna 10 according to this exemplary embodiment, it is possible to efficiently feed power to the antenna by matching the impedance of the antenna with the characteristic impedance of the transmission line without using any impedance matching circuit.

Figure 4:
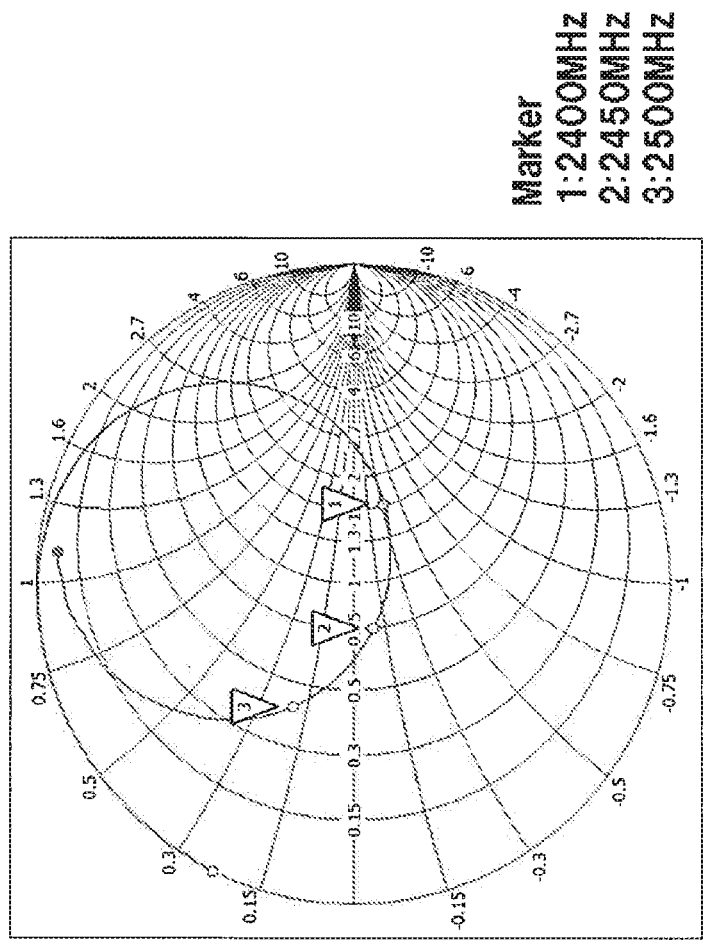
FIG. 4 is a Smith chart representing impedance characteristics of the antenna according to the first exemplary embodiment on the assumption of a wireless LAN of 2.4 GHz.
Figure 5:
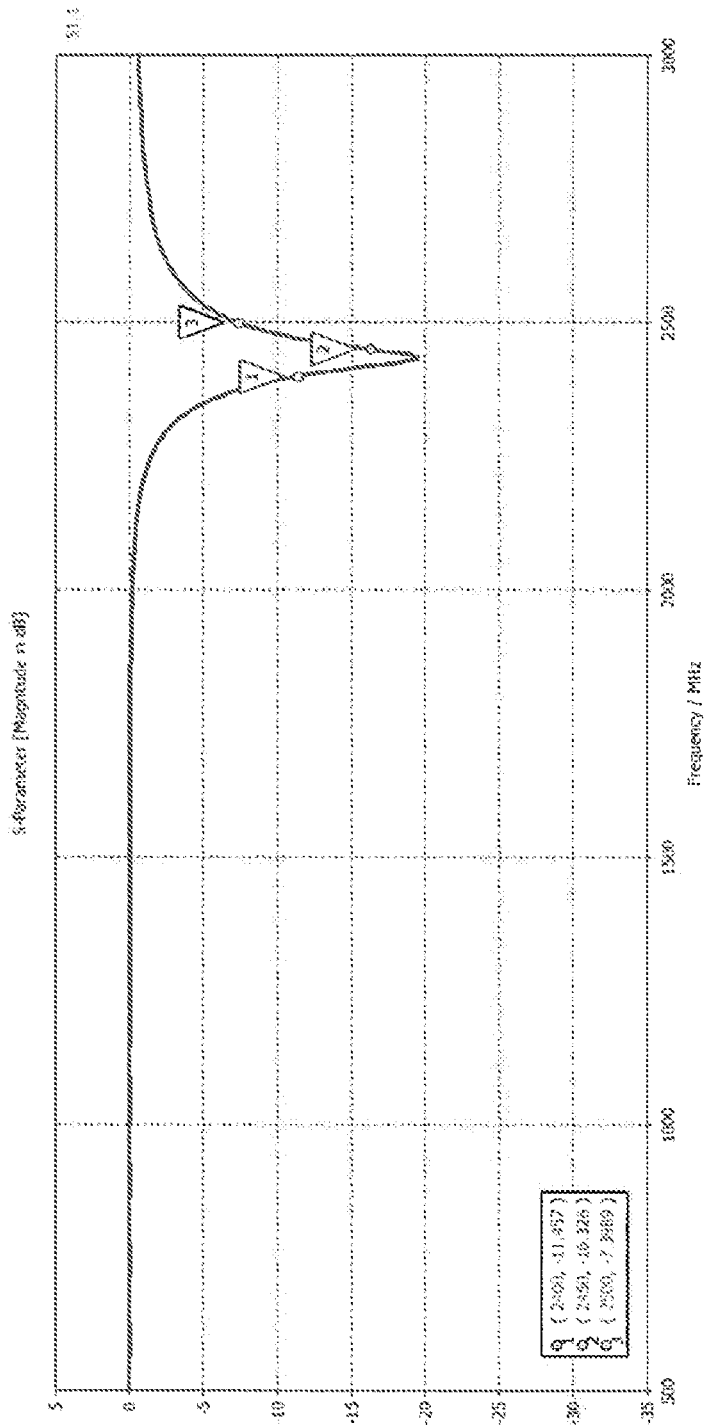
FIG. 5 is a graph representing return-loss characteristics of the antenna according to the first exemplary embodiment on the assumption of a wireless LAN of 2.4 GHz.
Figure 6:
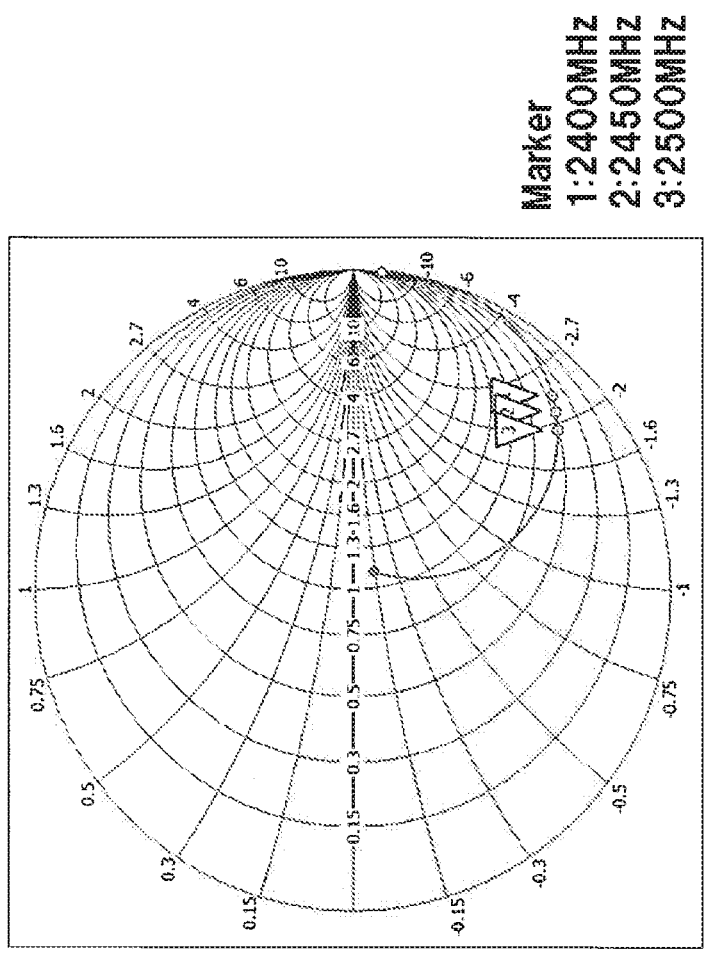
FIG. 6 is a Smith chart representing impedance characteristics of a known dipole antenna having a length of 40 mm.
Figure 7:
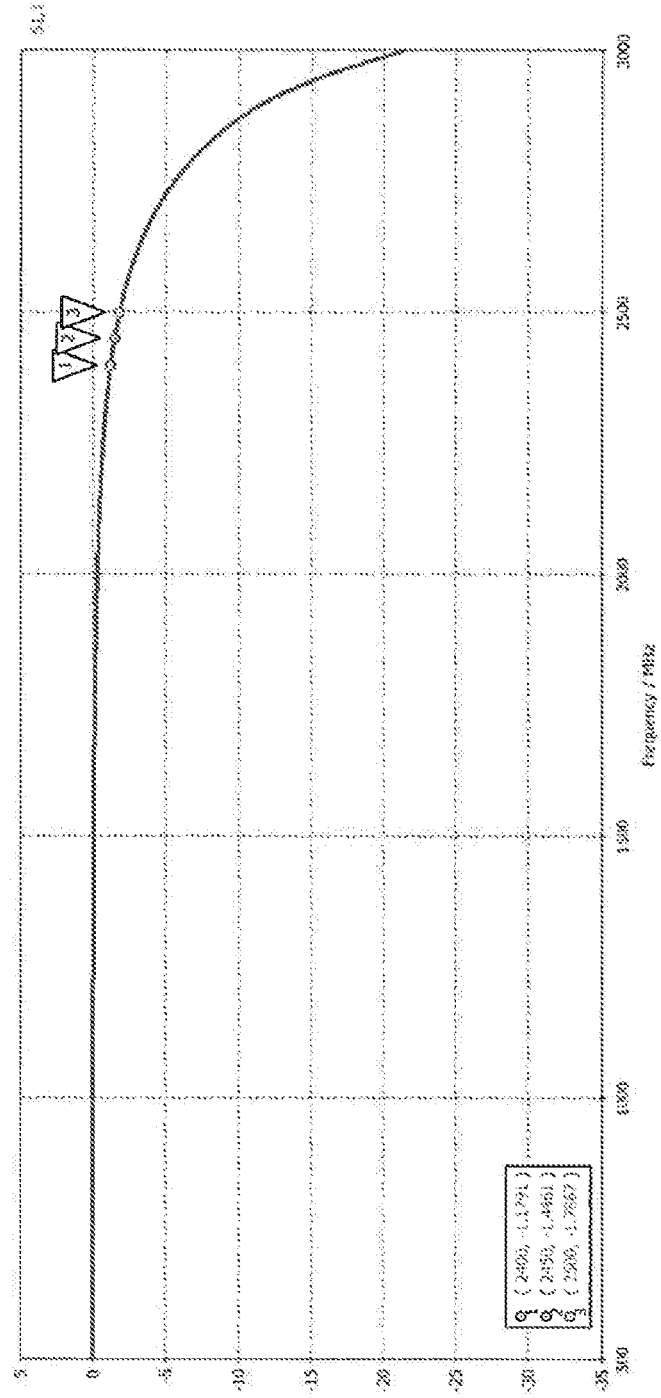
FIG. 7 is a graph representing return-loss characteristics of the known dipole antenna having a length of 40 mm.

A Smith chart representing the impedance characteristics and the return-loss characteristics of the antenna 10 according to the first exemplary embodiment on the assumption of a wireless LAN of 2.4 GHz as an example are depicted respectively in FIG. 4 and FIG. 5. In this example, the length from the tip of the first radiant element 3 to the tip of the second radiant element 4 is assumed to be 40 mm. According to the Smith chart in FIG. 4, the impedance curve is passing a central area in a frequency band from 2400 MHz to 2500 MHz used in a wireless LAN of 2.4 GHz, which indicates excellent impedance matching. Similarly, according to the return-loss characteristics in FIG. 5, the reflection is small in the corresponding frequency band, which indicates excellent impedance matching. As a conventional example for comparison, the Smith chart and the return-loss characteristics of a dipole antenna having a length of 40 mm, which is the same as the above, are illustrated respectively in FIG. 6 and FIG. 7. According to FIG. 6 and FIG. 7, although the lengths are the same, the resonant frequency is in a range of 3000 MHz and above, and, for this reason, the return loss of only approximately −2 dB is obtained in the band from 2400 MHz to 2500 MHz, which is used by the wireless LAN. This is because the length of the dipole antenna is shorter than half the wavelength, which implies that longer elements are needed for the use in the band corresponding to the wireless LAN.

As described above, in the case of the antenna 10 according to this exemplary embodiment, it is possible to reduce the size of the antenna compared with known antennas. In addition, in the case of the antenna 10 according to this exemplary embodiment, it is not necessary to insert any certain impedance matching circuit, which makes it possible to manufacture the antenna 10 in a general manufacturing process for printed circuit boards. Hence, according to this exemplary embodiment, a small antenna possible to be manufactured at a low cost can be provided.

At least one antenna 10 as that described above can be included in a wireless communication device having a communication function. Since the antenna 10 can be small, such a wireless communication device as a whole can be small.

The configuration illustrated in the above-described first exemplary embodiment is merely an example and may have any of the following configurations, for example. FIG. 8 to FIG. 13 used in the following description are top views illustrating other configurations of the antenna 10 according to the first exemplary embodiment.

Figure 8:
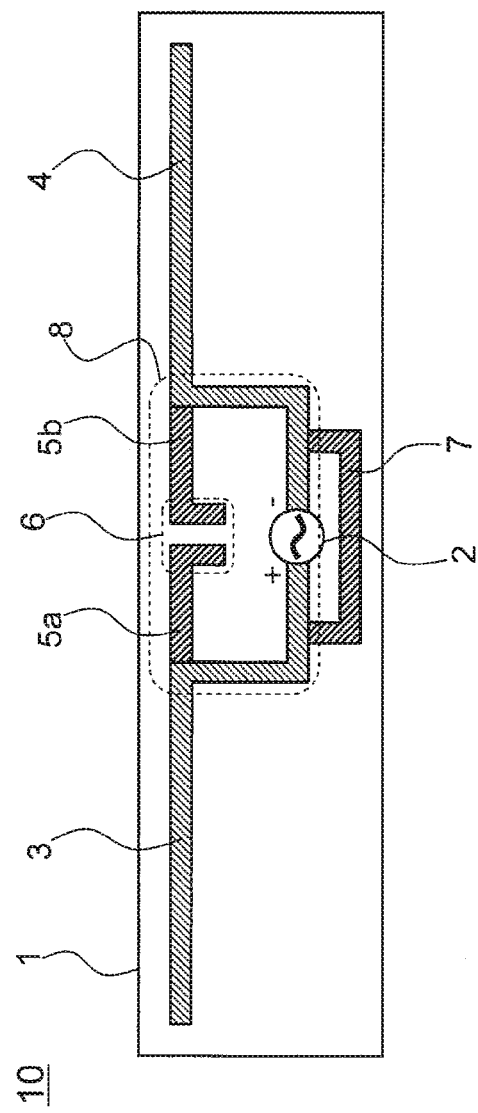
FIG. 8 is a top view illustrating a different configuration of the antenna according to the first exemplary embodiment.
Figure 9:
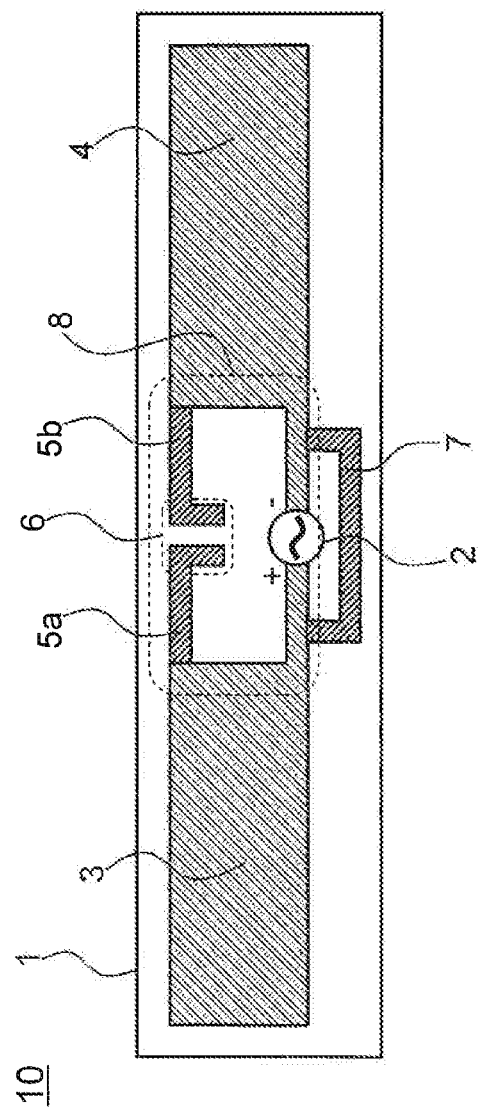
FIG. 9 is a top view illustrating a different configuration of the antenna according to the first exemplary embodiment.
Figure 10:
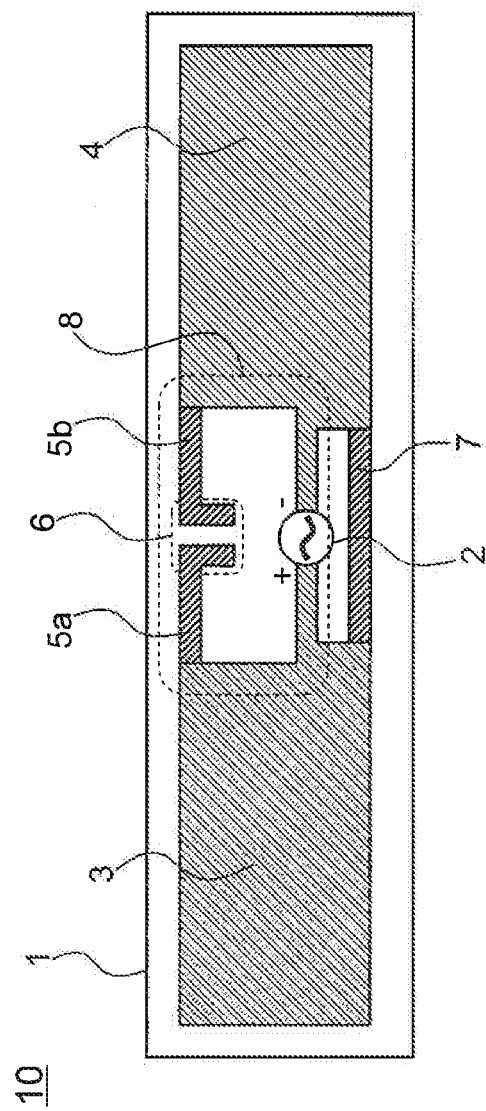
FIG. 10 is a top view illustrating a different configuration of the antenna according to the first exemplary embodiment.

FIG. 1 illustrates, as an example, a case in which the first radiant element 3 and the second radiant element 4 are linear. However, the shape of each of the first radiant element 3 and the second radiant element 4 does not necessarily be linear. For example, as illustrated in FIG. 8, the shape of each of the first radiant element 3 and the second radiant element 4 may be a polygonal line. Alternatively, for example, as illustrated in FIG. 9, the shape of each of the first radiant element 3 and the second radiant element 4 may have a large width on the side to which the corresponding one of the first branch part 5a and the second branch part 5b is connected. For example, as illustrated in FIG. 10, the shape of each of the first radiant element 3 and the second radiant element 4 may have a large width also on the side to which the connection element 7 is connected. In the cases of the FIG. 8, FIG. 9, and FIG. 10, the first branch part 5a, the second branch part 5b, the split 6, part of the first radiant element 3, and part of the second radiant element 4 form the split ring resonator 8 as in FIG. 1. Hence, the split ring resonator 8 operates as an antenna at the resonant frequency of the split ring resonator 8.

Figure 11:
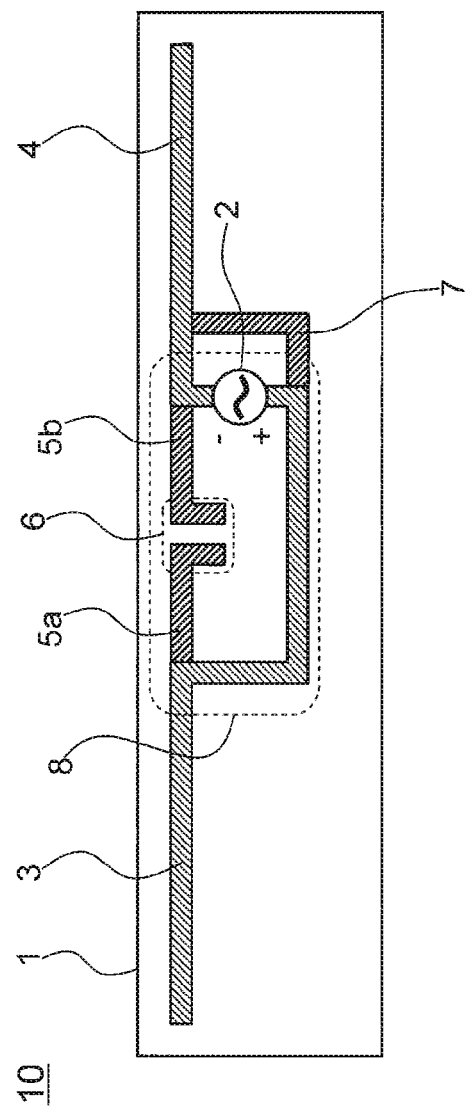
FIG. 11 is a top view illustrating a different configuration of the antenna according to the first exemplary embodiment.

FIG. 1 illustrates, as an example, a case in which the antenna feeding point 2 is provided at the center of the antenna 10. However, the antenna feeding point 2 does not necessarily need to be provided at the center of the antenna 10. For example, as illustrated in FIG. 11, the antenna feeding point 2 may be disposed at a position between the center and the second branch part 5b. In this case, the connection element 7 is connected to positions between the center and the second branch part 5b so as to correspond to the position of the antenna feeding point 2. Alternatively, the antenna feeding point 2 may be placed at a position between the center and the first branch part 5a, although not illustrated. In this case, the connection element 7 is connected to positions between the center and the first branch part 5a so as to correspond to the position of the antenna feeding point 2.

Figure 12:
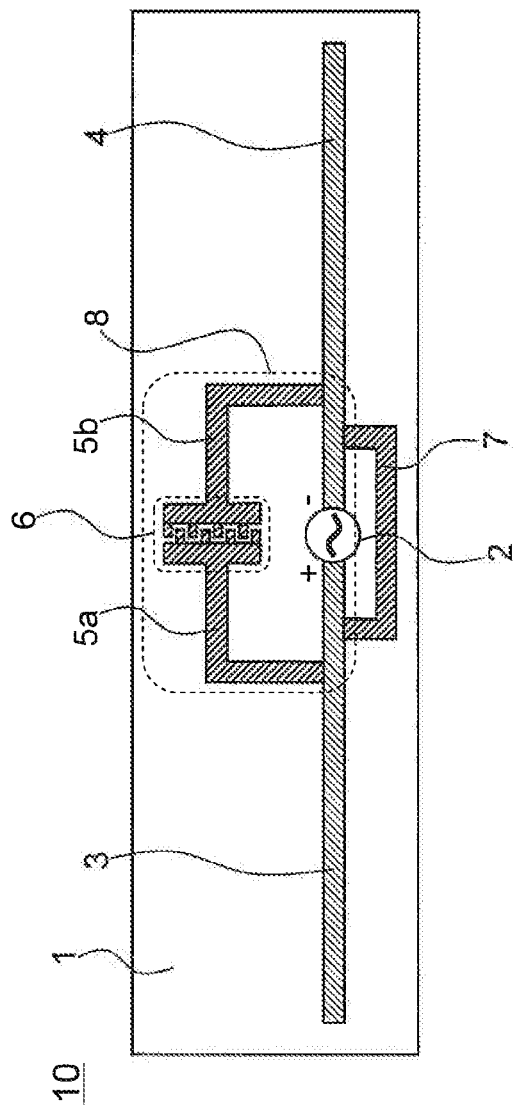
FIG. 12 is a top view illustrating a different configuration of the antenna according to the first exemplary embodiment.

FIG. 1 illustrates, as an example, a case in which the split 6 is formed by end portions of the first branch part 5a and the second branch part 5b being simply positioned close to each other. However, the split 6 may have any configuration as long as capacitance is formed between the end portions of the first branch part 5a and the second branch part 5b. For example, as illustrated in FIG. 12, the split 6 may have an interdigital shape in which an end portion of the first branch part 5a and an end portion of the second branch part 5b formed in comb shapes are arranged so as to mesh with each other. In this case, it is possible to increase the capacitance at the split 6 without increasing the size, which allows the antenna 10 to be even smaller.

Figure 13:
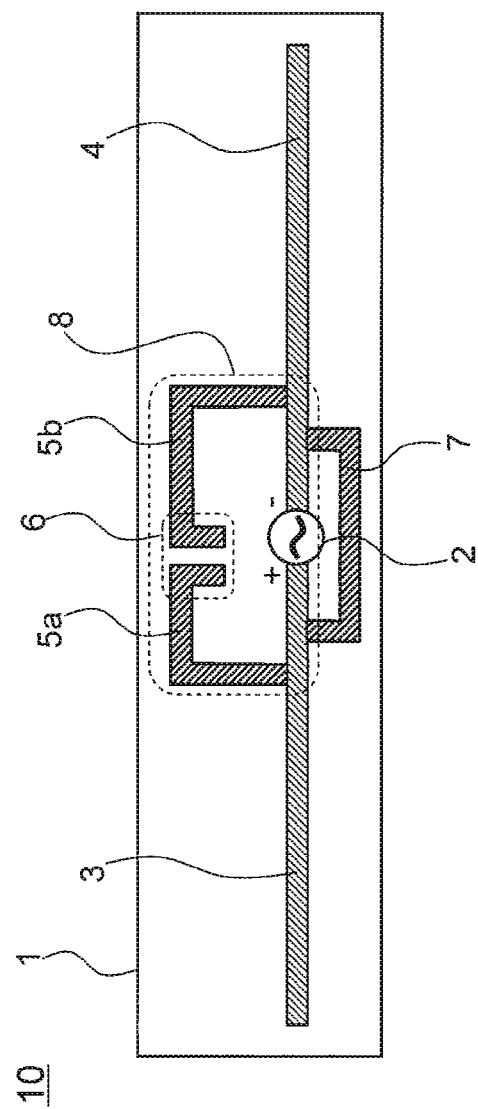
FIG. 13 is a top view illustrating a different configuration of the antenna according to the first exemplary embodiment.

FIG. 1 illustrates, as an example, a case in which the split 6 is provided at the center of the antenna 10. However, the split 6 does not necessarily need to be provided at the center of the antenna 10. For example, as illustrated in FIG. 13, the split 6 may be provided at a position between the center and the first branch part 5a.

FIG. 1 further illustrates, as an example, a case in which the first radiant element 3, the second radiant element 4, the first branch part 5a, and the second branch part 5b are formed on the same layer of the printed circuit board 1. However, it is also conceivable that one or more of the conductive patterns are formed on a layer different from that for the others. For example, a configuration in which the connection element 7 is formed on a rear surface of the printed circuit board 1 may be employed. In this case, the connection element 7 is connected to the first radiant element 3 and the second radiant element 4 by use of conductive vias formed in the printed circuit board 1.

Second Exemplary Embodiment

An antenna 20 according to a second exemplary embodiment of the present invention is described below with reference to the drawings. The second exemplary embodiment is the same as the antenna 10 according to the first exemplary embodiment except for the following respect. Note that the same reference signs as those of the antenna 10 according to the first exemplary embodiment are assigned to the common constituent elements, and description thereof is omitted.

The first exemplary embodiment illustrates, as an example, a case in which the connection element 7 has a long and narrow linear shape. However, the connection element 7 may have any shape as long as having one end connected to part of the first radiant element 3, having the other end connected to part of the second radiant element 4, and electrically connecting the first radiant element 3 and the second radiant element 4 so that the split 6 is not included in the area surrounded by the connection element 7, the first radiant element 3, and the second radiant element 4.

Figure 14:
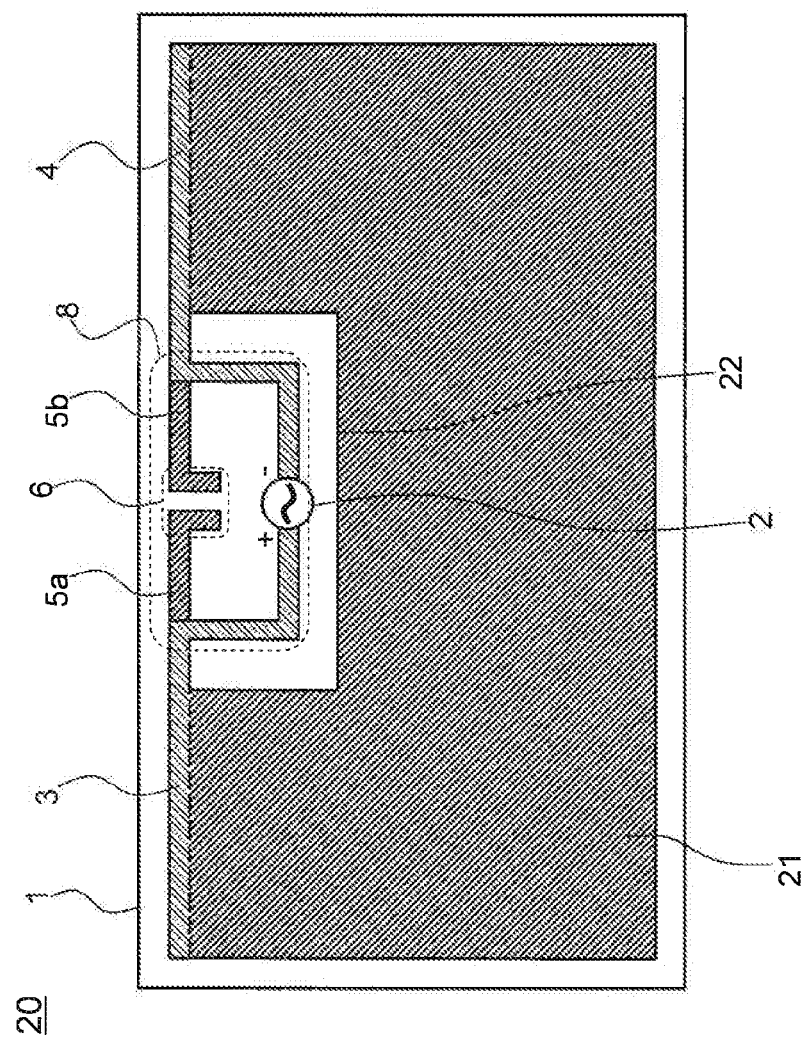
FIG. 14 is a top view of a configuration of an antenna according to a second exemplary embodiment.

FIG. 14 is a top view illustrating a configuration of the antenna 20 according to the second exemplary embodiment. The antenna 20 illustrated in FIG. 14 is based on the antenna according to the first exemplary embodiment in FIG. 8 and includes a ground plane 21 instead of the connection element 7. The ground plane 21 is a plane-shaped conductor formed on the printed circuit board 1 and includes a cutout part 22 at least at one side. The cutout part 22 is rectangular in FIG. 14 as an example but is not limited to this shape. For example, the shape of the cutout part 22 may be an arc or a polygon other than a rectangle. The first radiant element 3 is connected to the ground plane 21 at a position that is at the side including the cutout part 22 and is different from that of the cutout part 22. In addition, the second radiant element 4 is connected to the ground plane 21 at a position that is at the side including the cutout part 22 and is opposite of the cutout part 22 from the position at which the first radiant element 3 is connected. The antenna feeding point 2 is disposed in the cutout part 22, and the split 6 is disposed opposite of the antenna feeding point 2 from the ground plane 21.

With the above-described configuration, the ground plane 21 electrically connects the first radiant element 3 and the second radiant element 4 so that the split 6 is not included in the area surrounded by the ground plane 21, the first radiant element 3, and the second radiant element 4. Accordingly, the ground plane 21 of this exemplary embodiment operates exactly the same as the connection element 7 of the first exemplary embodiment. In the antenna 20 according to this exemplary embodiment, the impedance of the antenna seen from the antenna feeding point 2 can easily be controlled by changing the positions at which the ground plane 21 is connected to the first radiant element 3 and the second radiant element 4. In this way, it is possible to efficiently feed power to the antenna by matching the impedance of the antenna with the characteristic impedance of the transmission line without using any impedance matching circuit.

The ground plane 21 can provide ground potential and other power supply potentials by being connected to unillustrated components such as an LSI (large scale integration) and an IC (integrated circuit). FIG. 14 illustrates, as an example, a case in which no component or wire is disposed in the area of the ground plane 21. However, components, such as an LSI and an IC, and wires may be disposed in the area of the ground plane 21. For example, a configuration in which an RF (radio frequency) circuit connected to the antenna feeding point 2 is provided in part of the area of the printed circuit board 1 may be employed.

Figure 15:
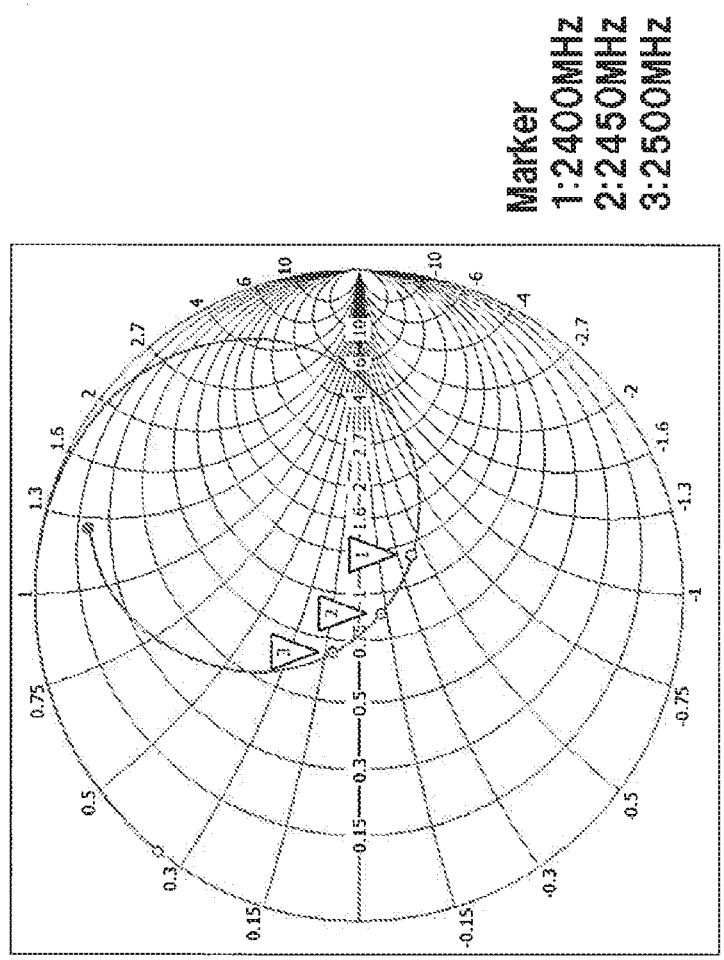
FIG. 15 is a Smith chart representing impedance characteristics of the antenna according to the second exemplary embodiment on the assumption of a wireless LAN of 2.4 GHz.
Figure 16:
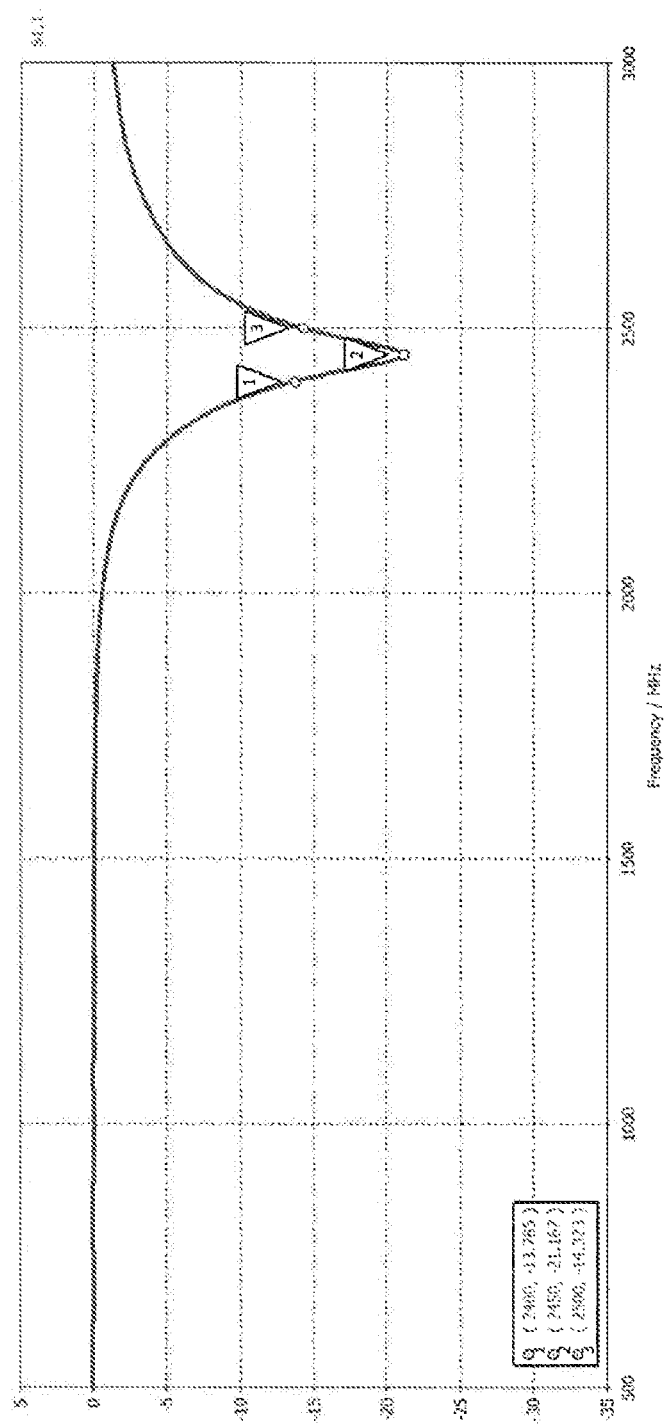
FIG. 16 is a graph representing return-loss characteristics of the antenna according to the second exemplary embodiment on the assumption of a wireless LAN of 2.4 GHz.

A Smith chart representing the impedance characteristics and the return-loss characteristics of the antenna 20 according to the second exemplary embodiment on the assumption of a wireless LAN of 2.4 GHz are depicted respectively in FIG. 15 and FIG. 16. In this example, the length from the tip of the first radiant element 3 to the tip of the second radiant element 4 is assumed to be 40 mm. According to the Smith chart in FIG. 15, the impedance curve is passing a central area in a frequency band from 2400 MHz to 2500 MHz used in the wireless LAN of 2.4 GHz, which indicates excellent impedance matching. Similarly, according to the return-loss characteristics in FIG. 16, the reflection is small in the corresponding frequency band, which indicates excellent impedance matching.

As described above, in the case of the antenna 20 according to this exemplary embodiment, as the antenna 10 according to the first exemplary embodiment, it is possible to reduce the size of the antenna compared with known antennas. In addition, it is not necessary to insert any certain impedance matching circuit, which makes it possible to manufacture the antenna 20 in a general manufacturing process for printed circuit boards. Hence, according to this exemplary embodiment, as the first exemplary embodiment, a small antenna possible to be manufactured at a low cost can be provided.

At least one antenna 20 as that described above can be included in a wireless communication device having a communication function. Since the antenna 20 can be small, such a wireless communication device as a whole can be small.

Figure 17:
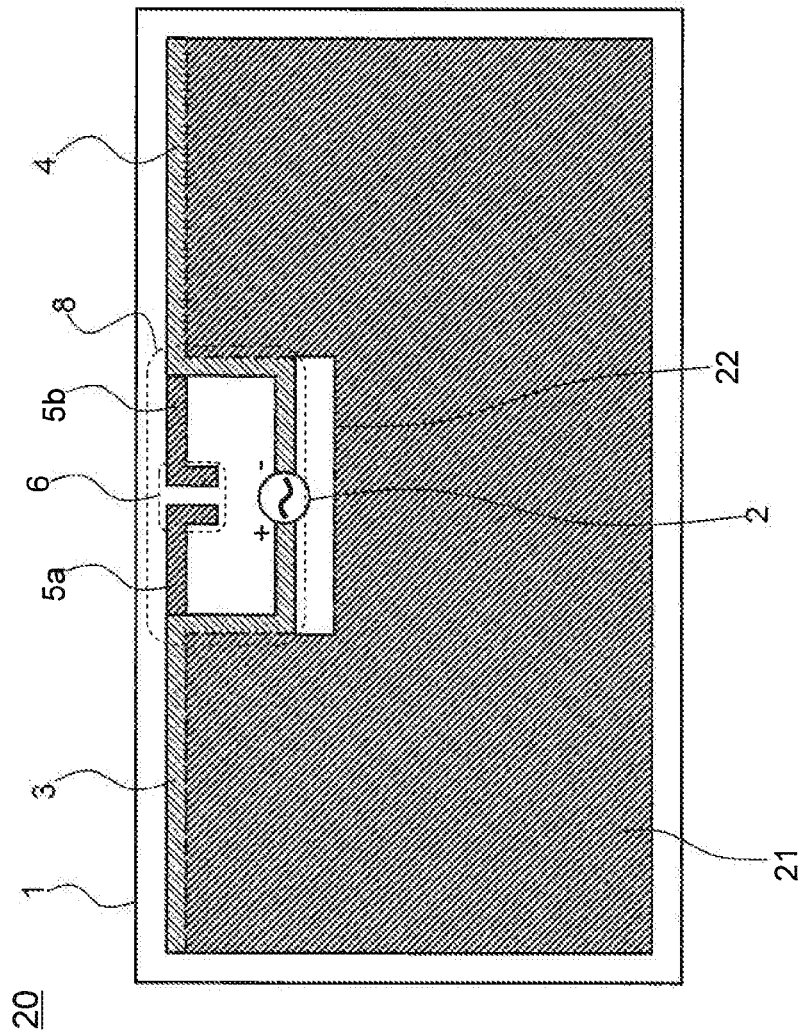
FIG. 17 is a top view of a different configuration of the antenna according to the second exemplary embodiment.
Figure 18:
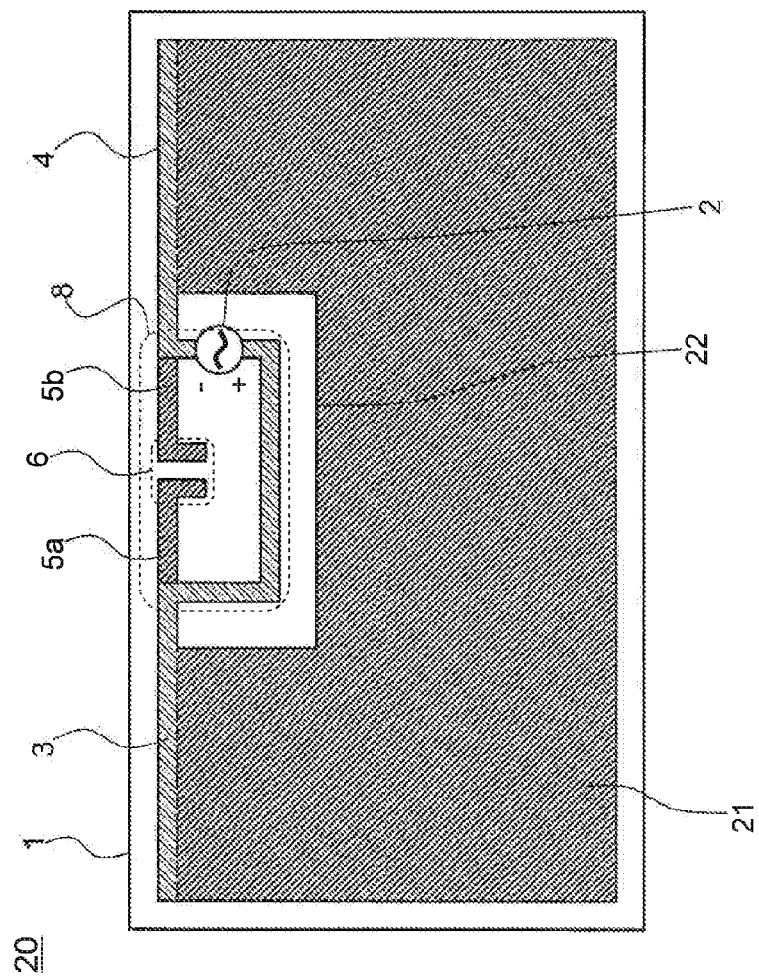
FIG. 18 is a top view of a different configuration of the antenna according to the second exemplary embodiment.

The configuration illustrated in the above-described second exemplary embodiment is merely an example and may have any of the following configurations, for example. FIG. 17 to FIG. 19 used in the following description are top views illustrating other configurations of the antenna 20 according to the second exemplary embodiment.

The antenna 20 illustrated in FIG. 17 is based on FIG. 14, and the ground plane 21 and the first radiant element 3 are connected not only at the side including the cutout part of the ground plane 21 but also in the cutout part 22. In addition, the ground plane 21 and the second radiant element 4 are connected not only at the side including the cutout part of the ground plane 21 but also in the cutout part 22. With this configuration, the first radiant element 3 and the second radiant element 4 can be formed as conductive patterns that are almost integrated with the ground plane 21. This allows components and wires to be disposed further closer to the first radiant element 3 and the second radiant element 4.

The antenna 20 illustrated in FIG. 18 is based on FIG. 11 and has the same configuration as that in FIG. 14 for the rest. In this case, as in the antenna 20 in FIG. 14, the impedance of the antenna seen from the antenna feeding point 2 can easily be controlled by changing the positions at which the ground plane 21 is connected to the first radiant element 3 and the second radiant element 4. In this way, it is possible to efficiently feed power to the antenna by matching the impedance of the antenna with the characteristic impedance of the transmission line without using any impedance matching circuit.

The antenna 20 illustrated in FIG. 19 is based on FIG. 18, and the ground plane 21 and the first radiant element 3 are connected not only at the side including the cutout part of the ground plane 21 but also in the cutout part 22. With this configuration, the first radiant element 3 can be formed as a conductive pattern that is almost integrated with the ground plane 21, which allows components and wires to be disposed further closer to the first radiant element 3. Alternatively, the ground plane 21 and the second radiant element 4 may be connected not only at the side including the cutout part of the ground plane 21 but also in the cutout part 22, although not illustrated. With this configuration, the second radiant element 4 can be formed as a conductive pattern that is almost integrated with the ground plane 21, which allows components and wires to be disposed further closer to the second radiant element 4.

The exemplary embodiments of the present invention are described above with reference to the drawings. However, the exemplary embodiments are provided as examples of the present invention and the present invention may employ any of various configurations other than the above. Moreover, the above-described exemplary embodiments may be combined within the range that does not cause any conflict over the nature.

Supplementary notes of examples of reference embodiments are provided below.

1.

An antenna including:

an antenna feeding point that includes a first terminal and a second terminal;

a first radiant element that is conductive and connected to the first terminal;

a second radiant element that is conductive and connected to the second terminal;

a first branch part that is conductive and one end of which is connected to the first radiant element at a position not corresponding to an end portion of the first radiant element;

a second branch part that is conductive and one end of which is connected to the second radiant element at a position not corresponding to an end portion of the second radiant element; and a connection element that is conductive and connects part of the first radiant element and part of the second radiant element, wherein a different end of the first branch part and a different end of the second branch part face each other and form a capacitor part, the capacitor part is positioned outside an area surrounded by the connection element, the first radiant element, and the second radiant element, and part of the first radiant element, part of the second radiant element, the first branch part, the second branch part, and the capacitor part form a split ring resonator.

2.

The antenna according to 1., wherein the capacitor part has an interdigital shape.

3.

The antenna according to 1. or 2., wherein the first and second radiant elements are linear.

4.

The antenna according to any one of 1. to 3., wherein the connection element is linear.

5.

The antenna according to any one of 1. to 3., wherein the connection element is a conductive plane having a linearly formed side at least as part of an outer periphery of the connection element, the side includes a cutout part, the first radiant element and the second radiant element are connected to respective parts having the cutout part therebetween, and the antenna feeding point is disposed in the cutout part.

6.

The antenna according to 5., wherein the cutout part has a rectangular shape.

7.

A printed circuit board including at least one antenna that includes:

an antenna feeding point that includes a first terminal and a second terminal;

a first radiant element that is conductive and connected to the first terminal;

a second radiant element that is conductive and connected to the second terminal;

a first branch part that is conductive and one end of which is connected to the first radiant element at a position not corresponding to an end portion of the first radiant element;

a second branch part that is conductive and one end of which is connected to the second radiant element at a position not corresponding to an end portion of the second radiant element; and a connection element that is conductive and connects part of the first radiant element and part of the second radiant element, and in which a different end of the first branch part and a different end of the second branch part face each other and form a capacitor part, the capacitor part is positioned outside an area surrounded by the connection element, the first radiant element, and the second radiant element, and part of the first radiant element, part of the second radiant element, the first branch part, the second branch part, and the capacitor part form a split ring resonator.

8.

The printed circuit board according to 7., wherein the capacitor part has an interdigital shape.

9.

The printed circuit board according to 7. or 8., wherein the first and second radiant elements are linear.

10.

The printed circuit board according to any one of 7. to 10., wherein the connection element is linear.

11.

The printed circuit board according to any one of 7. to 10., wherein the connection element is a conductive plane having a linearly formed side at least as part of an outer periphery of the connection element, the side includes a cutout part, the first radiant element and the second radiant element are connected to respective parts having the cutout part therebetween, and the antenna feeding point is disposed in the cutout part.

12.

The printed circuit board according to 11., wherein the cutout part has a rectangular shape.

13.

A wireless communication device including at least one antenna that includes:

an antenna feeding point that includes a first terminal and a second terminal;

a first radiant element that is conductive and connected to the first terminal;

a second radiant element that is conductive and connected to the second terminal;

a first branch part that is conductive and one end of which is connected to the first radiant element at a position not corresponding to an end portion of the first radiant element;

a second branch part that is conductive and one end of which is connected to the second radiant element at a position not corresponding to an end portion of the second radiant element; and a connection element that is conductive and connects part of the first radiant element and part of the second radiant element, and in which a different end of the first branch part and a different end of the second branch part face each other and form a capacitor part, the capacitor part is positioned outside an area surrounded by the connection element, the first radiant element, and the second radiant element, and part of the first radiant element, part of the second radiant element, the first branch part, the second branch part, and the capacitor part form a split ring resonator.

14.

The wireless communication device according to 13., wherein the capacitor part has an interdigital shape.

15.

The wireless communication device according to 13. or 14., wherein the first and second radiant elements are linear.

16.

The wireless communication device according to any one of 13. to 15., wherein the connection element is linear.

17.

The wireless communication device according to any one of 13. to 15., wherein the connection element is a conductive plane having a linearly formed side at least as part of an outer periphery of the connection element, the side includes a cutout part, the first radiant element and the second radiant element are connected to respective parts having the cutout part therebetween, and the antenna feeding point is disposed in the cutout part.

18.

The wireless communication device according to 17., wherein the cutout part has a rectangular shape.

REFERENCE SIGNS LIST 1 printed circuit board
2 antenna feeding point
3 first radiant element
4 second radiant element
5a first branch part
5b second branch part
6 split 7 connection element
8 split ring resonator
10, 20 antenna
21 ground plane
22 cutout part

The invention claimed is:

1. An antenna comprising:
   an antenna feeding point that includes a first terminal and a second terminal;
   a first radiant element that is conductive and connected to the first terminal;
   a second radiant element that is conductive and connected to the second terminal;
   a first branch part that is conductive and one end of which is connected to the first radiant element at a position not corresponding to an end portion of the first radiant element;
   a second branch part that is conductive and one end of which is connected to the second radiant element at a position not corresponding to an end portion of the second radiant element; and
   a connection element that is conductive and connects part of the first radiant element and part of the second radiant element, wherein
   a different end of the first branch part and a different end of the second branch part face each other and form a capacitor part,
   the capacitor part is positioned outside an area surrounded by the connection element, the first radiant element, and the second radiant element, and
   part of the first radiant element, part of the second radiant element, the first branch part, the second branch part, and the capacitor part form a split ring resonator.

2. The antenna according to claim 1, wherein the capacitor part has an interdigital shape.

3. The antenna according to claim 1, wherein the first and second radiant elements are linear.

4. The antenna according to claim 1, wherein the connection element is linear.

5. The antenna according to claim 1, wherein the connection element is a conductive plane having a linearly formed side at least as part of an outer periphery of the connection element, the side includes a cutout part, the first radiant element and the second radiant element are connected to respective parts having the cutout part therebetween, and the antenna feeding point is disposed in the cutout part.

6. The antenna according to claim 5, wherein the cutout part has a rectangular shape.

7. A printed circuit board comprising at least one antenna that includes: an antenna feeding point that includes a first terminal and a second terminal; a first radiant element that is conductive and connected to the first terminal; a second radiant element that is conductive and connected to the second terminal; a first branch part that is conductive and one end of which is connected to the first radiant element at a position not corresponding to an end portion of the first radiant element;

a second branch part that is conductive and one end of which is connected to the second radiant element at a position not corresponding to an end portion of the second radiant element; and a connection element that is conductive and connects part of the first radiant element and part of the second radiant element, and in which a different end of the first branch part and a different end of the second branch part face each other and form a capacitor part, the capacitor part is positioned outside an area surrounded by the connection element, the first radiant element, and the second radiant element, and part of the first radiant element, part of the second radiant element, the first branch part, the second branch part, and the capacitor part form a split ring resonator.

8. A wireless communication device comprising at least one antenna that includes; an antenna feeding point that includes a first terminal and a second terminal; a first radiant element that is conductive and connected to the first terminal; a second radiant element that is conductive and connected to the second terminal; a first branch part that is conductive and one end of which is connected to the first radiant element at a position not corresponding to an end portion of the first radiant element;

a second branch part that is conductive and one end of which is connected to the second radiant element at a position not corresponding to an end portion of the second radiant element; and a connection element that is conductive and connects part of the first radiant element and part of the second radiant element, and in which a different end of the first branch part and a different end of the second branch part face each other and form a capacitor part, the capacitor part is positioned outside an area surrounded by the connection element, the first radiant element, and the second radiant element, and part of the first radiant element, part of the second radiant element, the first branch part, the second branch part, and the capacitor part form a split ring resonator.

* * * * *